(12) United States Patent
Jahangir

(10) Patent No.: US 7,898,457 B2
(45) Date of Patent: Mar. 1, 2011

(54) SYSTEM AND METHOD FOR PROCESSING IMAGERY FROM SYNTHETIC APERTURE SYSTEMS

(75) Inventor: Mohammed Jahangir, Birmingham (GB)

(73) Assignee: Qinetiq Limited, London (GB)

( * ) Notice: Subject to any disclaimer, the term of this patent is extended or adjusted under 35 U.S.C. 154(b) by 281 days.

(21) Appl. No.: 12/294,811

(22) PCT Filed: Mar. 19, 2007

(86) PCT No.: PCT/GB2007/000992

§ 371 (c)(1),
(2), (4) Date: Sep. 26, 2008

(87) PCT Pub. No.: WO2007/113469

PCT Pub. Date: Oct. 11, 2007

(65) Prior Publication Data

US 2009/0179790 A1    Jul. 16, 2009

(30) Foreign Application Priority Data

Mar. 31, 2006 (GB) ................................. 0606489.3

(51) Int. Cl.
G01S 13/90 (2006.01)
(52) U.S. Cl. ..................... 342/25 A; 342/25 F
(58) Field of Classification Search ............... 342/25 R, 342/25 A–25 F See application file for complete search history.

(56) References Cited

U.S. PATENT DOCUMENTS 5,550,937 A * 8/1996 Bell et al. .................... 382/293

(Continued)

FOREIGN PATENT DOCUMENTS

EP    0 984 413 A2    3/2000

(Continued)

OTHER PUBLICATIONS di Bisceglie, M.; Galdi, C.; , "CFAR detection of extended objects in high-resolution SAR images," Geoscience and Remote Sensing, IEEE Transactions on , vol. 43, No. 4, pp. 833-843, Apr. 2005.*

(Continued)

Primary Examiner—John B Sotomayor
(74) Attorney, Agent, or Firm—Oliff & Berridge, PLC

(57) ABSTRACT

A method of processing a temporal sequence of base images from a synthetic aperture system such as a synthetic aperture radar is provided that simplifies the task of identifying moving objects. The method comprises the steps of firstly temporally filtering a plurality of the base images to form a reference image, and secondly normalising the reference image with a base image to form a change detection image. The change detection image has the property that all moving objects are emphasised. Further processing can optionally be performed on the change detection image to remove false targets based on characteristics of the highlighted areas or on a temporal track taken over a plurality of change detection images. The invention allows detection of moving objects without requiring a Doppler return from a target. The invention extends to a system adapted to implement the method, and a computer program.

23 Claims, 8 Drawing Sheets

U.S. PATENT DOCUMENTS

| | | | |
|---|---|---|---|
| 5,821,896 A * | 10/1998 | Nakano et al. | 342/90 |
| 6,426,718 B1 | 7/2002 | Ridgway | |
| 6,801,155 B2 * | 10/2004 | Jahangir et al. | 342/90 |
| 7,411,540 B1 * | 8/2008 | Lopez et al. | 342/25 R |
| 2001/0010731 A1 | 8/2001 | Miyatake et al. | |
| 2003/0206129 A1 | 11/2003 | Obenshain | |
| 2006/0215935 A1 * | 9/2006 | Oldroyd | 382/294 |
| 2009/0179790 A1 * | 7/2009 | Jahangir | 342/25 B |
| 2010/0103175 A1 * | 4/2010 | Okutomi et al. | 345/428 |

FOREIGN PATENT DOCUMENTS

| | | |
|---|---|---|
| JP | A-61-180173 | 8/1986 |
| JP | A-2003-344532 | 12/2003 |
| JP | A-2005-345125 | 12/2005 |

OTHER PUBLICATIONS

Blucher et al.; "Prescreening Algorithm Assessment within the Analysts' Detection Support System;" *Radar Conference, 2003 Proceedings of the International Adelaide, SA*; Sep. 3, 2003; pp. 454-459.

Jahangir et al.; "Utilising signal absence in SAR imagery for moving target detection;" *IET Forum on Waveform Diversity and Design in Communication, Radar and Sonar*; Nov. 22, 2006; pp. 43-46.

* cited by examiner

Fig. 6.

| 1 | 1 | 0 | 0 |
|---|---|---|---|
| 0 | 1 | 0 | 0 |
| 0 | 0 | 1 | 1 |

SYSTEM AND METHOD FOR PROCESSING IMAGERY FROM SYNTHETIC APERTURE SYSTEMS

This invention relates to a method of and a system for processing imagery from synthetic aperture radar, sonar, and other systems employing a synthetic aperture. More specifically, it relates to the detection of moving targets in the imagery by observation of shadows produced by such moving targets.

Synthetic Aperture Radar (SAR) systems are known. SAR as an imaging technique has been developed to obtain high resolution radar imagery of surface features. It uses a technique of coherently integrating samples collected from a moving platform over a period of time and using the results to create an antenna having a large synthetic aperture to obtain very high azimuth compression of the sampled data. For best results these samples have to be all aligned in phase for a SAR image to be properly focused in azimuth. For a sideways looking SAR in order to obtain a focused image of the static ground this is simply a quadratic phase correction across a nominally straight-line synthetic aperture.

Detection of static targets may be performed using pre-screening algorithms as described in Reference 1. Such algorithms consist of three steps. A bright anomaly detector is applied to the high resolution SAR image followed by a clustering algorithm that groups neighbouring detections. Finally, a simple discriminator is used to reject detection clusters corresponding to false alarms. The pre-screening algorithms can be tuned to detect man-made objects and reject ground clutter. However, an essential pre-requisite is to have fully focused SAR images of the object of interest.

For a non-stationary object, there will be errors in the SAR phase history compared to that expected from a static scene. These phase errors distort and de-focus the SAR image and make it significantly more difficult to detect moving targets in SAR imagery.

Moving targets can also be detected using Ground Moving Target Indication (GMTI) radars. Such systems use Doppler returns to detect movement, and so will only work when the target has a non-zero radial velocity component toward the radar antenna.

Furthermore, the radial velocity has to be more than a specified Minimum Detection Velocity (MDV) to successfully register a detection. Another disadvantage with GMTI is the azimuth location accuracy is considerably worse compared to that possible with SAR, due to the much smaller effective antenna size, and hence directivity, used in GMTI system.

For SAR, the problem of focusing of the distorted images caused by moving targets has been investigated by many researchers, as described in References 2, 3 and 4. The basic idea behind all of these approaches is to estimate the phase error based on the direct energy return from the target. The estimated phase is used to either re-focus the SAR image or alternatively utilised in a variety of ways to assist with the detection of moving targets.

The drawback of these direct energy techniques is that they can lack robustness to strong clutter, have poor detection performance and can be computationally very intensive.

The phenomenon of radar shadows in SAR imagery is well understood for static targets. Any region of the image that is masked from the radar beam by objects within the scene will be in radar shadow. There will be no radar backscatter from this region and the entire shadow region will be at thermal noise level. The shadow region of a target has some useful properties. Since there is no speckle present it tends to be more stable than target and clutter regions. Furthermore, the shape of the shadow is related to the object dimensions. This behaviour associated with static target radar shadows has led to development of techniques that uses the shadow information for target detection (Reference 5), for the estimation of building heights (Reference 6) and in target classification (Reference 7).

The object of the present invention is to at least mitigate the problems of the prior art, and to provide an alternative solution for the detection of moving objects in synthetic aperture imagery such as SAR and synthetic aperture sonar.

According to a first aspect of the present invention there is provided a method of processing a temporal sequence of returns from a Synthetic Aperture system, the returns comprising a plurality of base images of a region characterised in that it comprises the steps of:

i) temporally filtering two or more of the plurality of base images to form a reference image, the two or more base images being suitably spatially aligned with respect to each other;

ii) forming a "change detection image" image by normalising the reference image with a given base image from the sequence, the given base image being suitably aligned with the reference image.

Note that the synthetic aperture system will typically be a Synthetic Aperture Radar (SAR) system. However, the method of the invention may equally be applied to a synthetic aperture sonar system, or other synthetic aperture systems able to generate images of a region. For convenience the description will, in general, refer to both synthetic aperture radar and sonar systems as SAR systems, and any implementation details given, for example in relation to the figures, that are specific to a particular system will be clear to the normally skilled person.

The present invention relates to a new approach that exploits radar or sonar shadow to aid in the detection and location of moving targets. By forming a change detection image as described, any relative movement of objects within the region will show as anomalies within the change detection image. This is because the shadow information caused by a moving object in a single image will be at a lower absolute level when compared to the reference image, as the formation of the reference image dilutes the impact of such shadow information due to the filtering process.

This invention extends the idea of using shadow information to the detection of moving targets. The shadow of the target is not reliant on any direct energy return from the target and is therefore free of any SAR image distortion. The shadow can provide a very accurate indication of the true location of the target. However, detecting shadows in individual SAR images will produce false alarms as a result of confusion with shadows from static objects and clutter regions with a low backscatter return. Provided there are available a sequence of SAR images from the same scene each slightly offset in time, then a shadow change detection algorithm will reject false alarms due to non-moving objects. This is because with a sequence of SAR images clutter and static target false alarms will not shift in the imagery. The shadows of moving targets on the other hand will change their position which makes it very easy to distinguish the genuine moving targets from the false alarms. This novel change detection technique has been shown to lead to a large reduction in false alarm rates and makes the detection of moving target shadows practical.

Note that in this specification a "base image" is an image of a region that comprises an image generated by a SAR system. Such a base image may be manipulated in terms of its resolution, its orientation or by a spatial filtering process, as appropriate, before being used in steps i) and ii) described above.

Preferably the temporally filtered representation of the plurality of base images in step i) is produced by generating an average image by summing successive base images and dividing by the number of base images summed. The base images may be consecutive. A reference image may be produced by other means however, such as by using a maximum filter to select the maximal value for corresponding pixels over a plurality of temporal base images to generate the reference image. The base images should be suitably spatially aligned before being temporally filtered such that, for the sequence of images, any given pixel position in each base image relates to the same part of the region. The alignment process may take place in a prior alignment step, or it may be performed as a part of the filtering process. The alignment may be done by rotating, shifting or otherwise transforming the images relative to each other, or by any other suitable means. Such alignment processes are well known in the relevant art.

The normalisation stage of step ii) may be performed by dividing the reference image by the given base image. Alternatively the normalisation may be performed in any other manner commensurate with the filtering process used in step i).

Preferably, the change detection image is passed to a threshold detector that highlights those parts of the change detection image that are above a given threshold value to produce an output image.

Advantageously, a plurality of change detection images, or, if a threshold detector is used, output images, are produced, each being associated with a particular base image. The reference image used in producing each change detection image is preferably updated for each normalisation step performed.

Preferably, each change detection or output image is processed using a pre-screening procedure. The pre-screening may comprise using a Constant False Alarm Rate (CFAR) algorithm. The pre-screening procedure may also comprise clustering or discrimination procedures.

Advantageously a temporal tracking algorithm may be performed on the outputs of the pre-screening procedure, or on a sequence of change detection or output images.

According to a second aspect of the present invention there is provided a processing system for processing returns from a Synthetic Aperture system comprising a processor adapted to receive data from the synthetic aperture system, the data comprising information from a region taken over a plurality of instances, the processing system comprising a processor adapted to process the data in the form of images, the images comprising a plurality of base images; characterised in that:
the processor is adapted to apply a temporal filter to two or more of the plurality of base images to form a reference image, the two or more base images being suitably spatially aligned with respect to each other; and
the processor is further adapted to normalise the reference image with a given base image to form an associated change detection image, the given base image being suitably aligned with the reference image.

The system may be integrated with a SAR system, or it may alternatively be implemented as a separate computer system. The data from the SAR may comprise "live" data, in which case the processor is preferably adapted to run in real time. Alternatively, the data from the SAR may be stored in a memory, such as on a hard disk, with the processor taking data from the hard disk at a later time. In this case the processor need not be adapted to run in real time.

According to a third aspect of the present invention there is provided a computer program adapted to implement the method of the first aspect of the present invention.

The computer program may be implemented on a dedicated computer system connected to the SAR, or it may be implemented on a separate computer system.

In order that the invention might be more fully understood, embodiments thereof will now be described, by way of example only, with reference to the accompanying drawings, in which:

FIG. 6 illustrates a binary sub-image for a hypothetical cluster; and

Figure 1A:
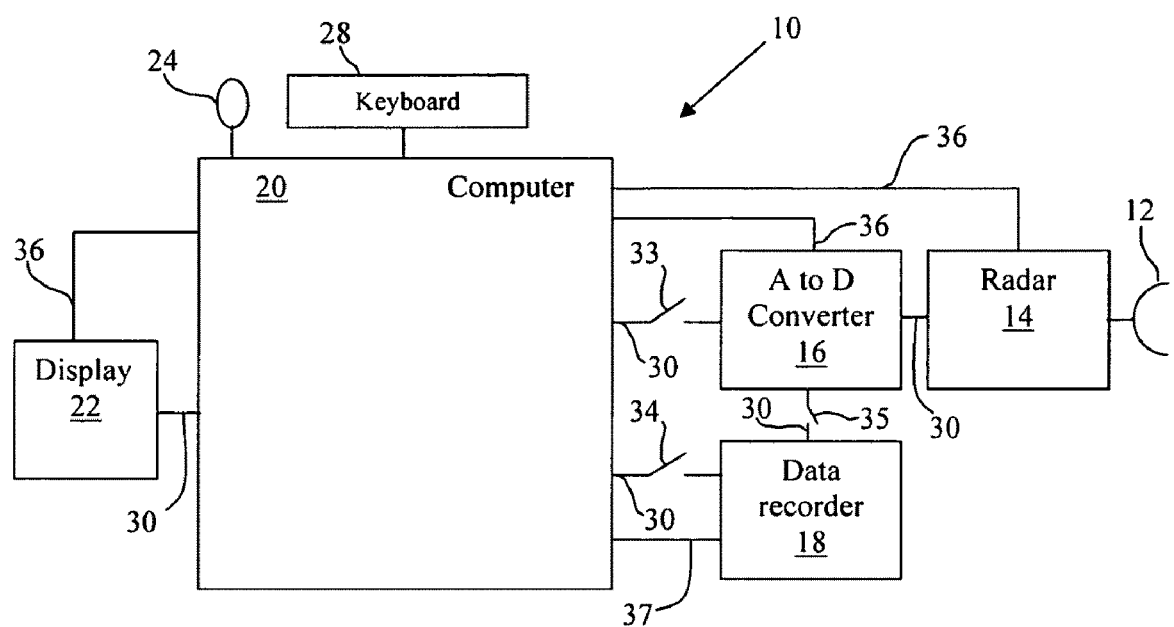
FIG. 1A is a schematic block diagram of a known synthetic aperture radar data gathering system capable of producing data suitable for the current invention.
Figure 1B:
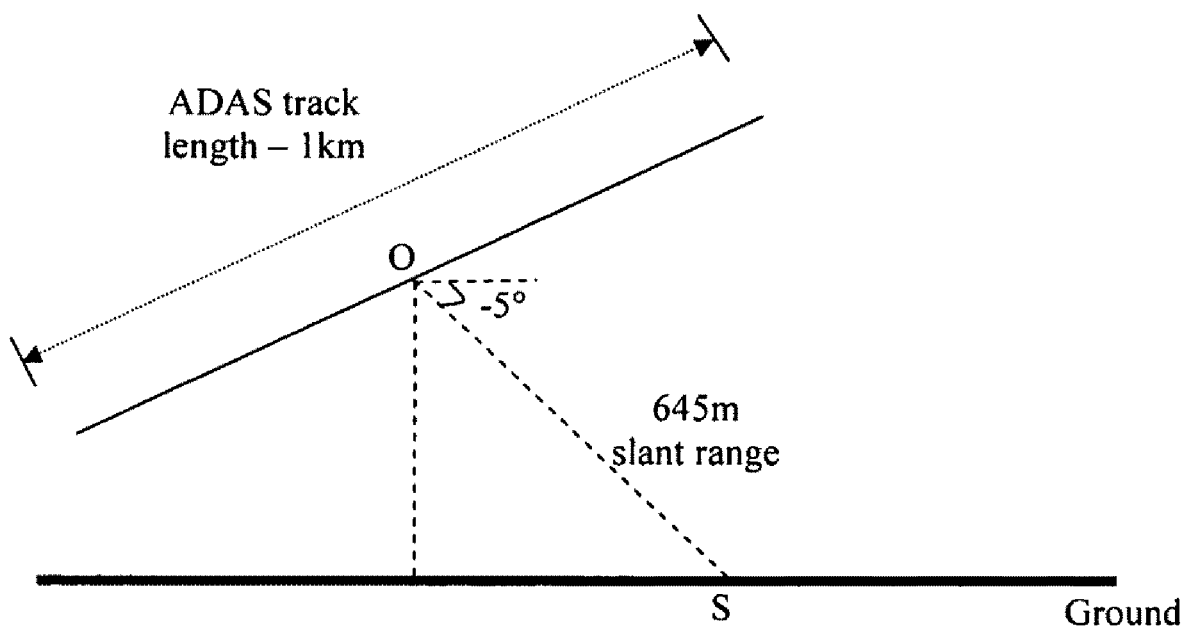
FIG. 1B illustrates the SAR imaging geometry configuration deployed by the system of FIG. 1a when collecting data.
Figure 2:
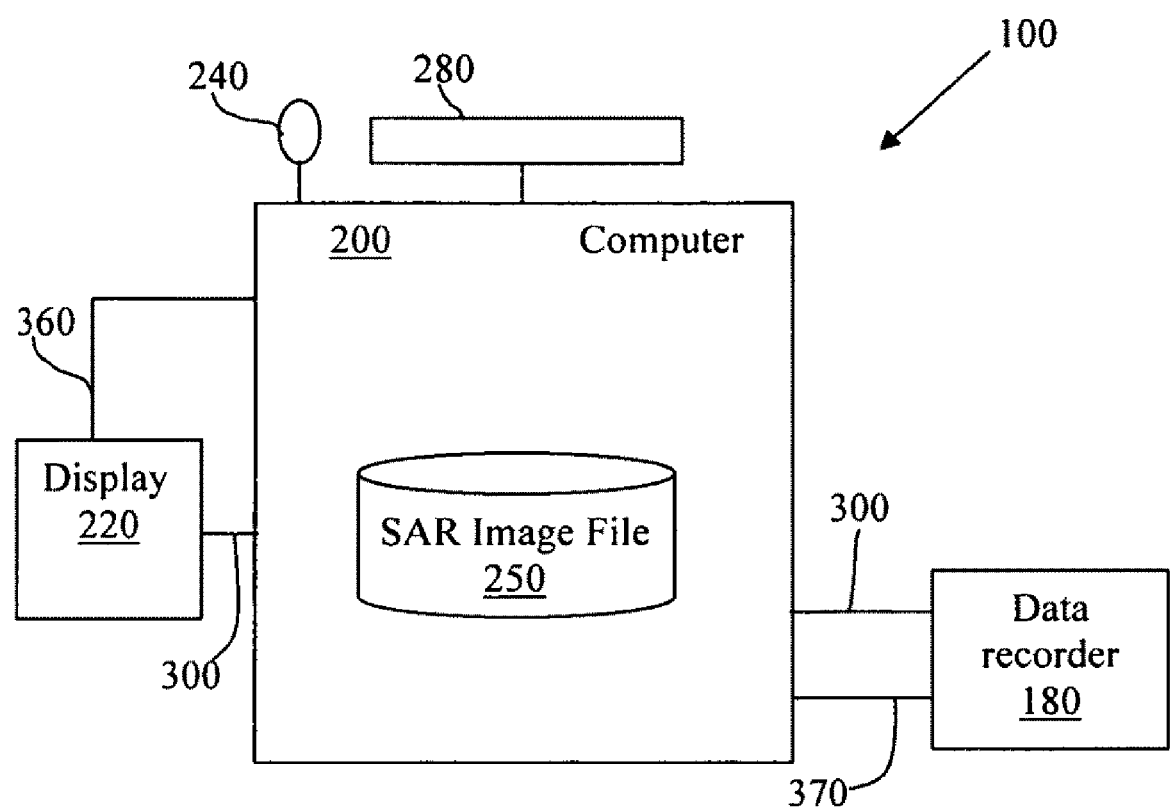
FIG. 2 is a schematic block diagram of the SAR image formation system of the invention.

Referring to FIGS. 1, and 2 there is shown a radar target detection system suitable for collecting data for use by the invention, and also for implementation of the invention. It is indicated generally by a data acquisition system 10 and a SAR image formation system 100 respectively. Each of the subsystems 10 and 100 are explained hence forth.

The system 10 referred to in FIG. 1A is the helicopter born Airborne Data Acquisition System (ADAS) manufactured and operated by Thales. The system 10 is used in the: collection of raw radar data, prior to processing according to the present invention. It comprises an antenna 12 mounted on the side of the helicopter, a radar 14, an analogue-to-digital (A to D) converter 16, a data recorder 18, a computer 20 and a display device 22. The computer 20 is under operator control via a mouse 24 and a keyboard 28. Data passes between parts of the system 10 along data lines 30, of which those between the computer and A-to-D converter 16, the computer 20 and data recorder 18, and the A-to-D converter 16 and data recorder 18 include respective switches 33, 34 and 35. Control lines 36 provide for computer-generated control signals to pass to the radar device 14, the A-to-D converter 16 and the display device 22. A communication line 37 is provided for passing messages between the computer 20 and data recorder 18.

The antenna 12 is a high gain horn antenna. The radar 14 is a coherent pulse radar. It uses the same antenna for transmitting and receiving and is therefore a monostatic system. It operates at a centre frequency of 9.75 GHz and at this frequency the antenna has a circular beam width of 7.5 degrees. The radar has a peak transmit power of 200 W that gives it a maximum operating range of 2000 m between itself and the target. It is capable of operating at a bandwidth ranging from 10 MHz to 500 MHz. In collecting the data used in an example embodiment described herein the operating bandwidth was set to 450 MHz. The radar is linearly polarised with both transmit and receive polarisations set to vertical. It operates by transmitting a series of pulses at a Pulse Repetition Frequency (PRF) of 4 kHz. Full details of the ADAS system can be found at the website given in Reference 8.

After each pulse has been transmitted, the radar is quiescent for a short duration and then records 1536 values corresponding to radar echo from a series of 1536 concurrent range cells. The range cells are arranged along a radial line extending outwardly from the antenna centre. The first range cell is the nearest in range to the antenna and the last the furthest in range. The radar uses the time delay between the end of transmission of a pulse and the start of the recording of the first range cell to determine the slant range offset to the start of the first range cell.

The antenna can pan −30 degrees to +30 degrees in azimuth and from 0 degrees to −20 degrees in elevation. For the collection of data used by the invention as described herein (shown in FIG. 7) the elevation angle is set to −5 degrees. The azimuth angle is adjusted manually so that it is pointing directly at the target. Each of the 1536 values that the radar records for each pulse that is transmitted is a complex valve with a real and imaginary part. The analogue signal is passed through an A-to-D converter where the signal is digitised. All subsequent processing is performed on the digital data. The radar transmits 4000 pulses per second and receives data for 1536 range cells for each pulse.

The A-to-D converter 16 is of a standard type, for example a Tektronics model TKAD10C and is capable of digitising both real and imaginary parts of a complex input signal. The data recorder 18 is a standard high-speed magnetic tape recorder, for example an Ampex 107 DCRsi recorder which records data at a rate of 107 Mbits s$^{-1}$ The computer 20 is a standard personal computer with a Pentium IV processor. The system 10 has a graphical user interface (GUI) which is displayed on the display device 22 and with which an operator may interact with the system 10 using the mouse 24 and the keyboard 28. Results generated by the system 10 are also displayed on the display device 22, together with radar housekeeping information generated by radar 14, such as the operating centre frequency, PRF etc. Referring to FIG. 1B, for the data collection a 1 km long helicopter track is chosen that gives 645 m slant range offset from the centre of the track (Point O) to the chosen scene centre point on the ground (Point S). The track altitude is chosen to give a grazing angle of −5° from track centre Point O to scene centre Point S. The helicopter is flown in a straight line along the track at a constant speed of 20 m/s. The antenna 12 azimuth is trained on the scene centre point. As the helicopter progresses along the track the azimuth angle of the antenna 12 is adjusted manually to keep the scene centre point within the centre of the radar beam. This form of data acquisition is termed spotlight mode imaging.

At the start of the imaging run the helicopter aligns along the designated imaging track. The antenna 12 is pointed at the scene centre point S. The initial azimuth squint angle of the antenna 12 is about +30 degrees. The radar device 14 is switched on using the computer 20. The switch 35 is closed and raw radar data is recorded onto device 18. The helicopter flies along the designated 1 km long track at a nominal speed of 20 m/s. As the helicopter progresses along the track the antenna 12 azimuth angle is continually adjusted. As the helicopter travels through the Point O the antenna 12 squint angle falls to 0 degrees. After this point the antenna 12 has negative squint angles. By the time the helicopter reaches the end of the 1 km long track the antenna 12 azimuth angle has squinted to a value of about −30 degrees. The switch 35 is opened and the radar 14 is shut down. The operator notes the address location of the data stored on device 18. The operator also notes the latitude, longitude and altitude of the chosen scene centre point S. This completes the data acquisition step for system 10.

Shown in FIG. 2 is a SAR image formation system 100, used to produce base images for later processing according to the present invention. It comprises a data recorder 180, a computer 200 and a display device 220. The computer 200 is under operator control via a mouse 240 and a keyboard 280. Data passes between parts of the system 100 along data lines 300. Control lines 360 provide for computer-generated control signals to pass to the display device 220. A communication line 370 is provided for passing messages between the computer 200 and data recorder 180. The data recorder 180, the computer 200 and its peripheries 220 to 370 are identical to the devices numbered 18 through to 37 in FIG. 1A.

In use, an operator uses keyboard 280 to set up parameters required by the system, including the latitude, longitude and altitude of a region of interest, along with required starting and ending azimuth squint angle of antenna 12 and number of squint angle steps. The squint angle is the off-boresight angle. Zero degree squint is the angle pointing in the direction of platform broadside. Positive squint is pointing toward the nose of the platform and negative squint along the tail. Thus for example the squint angle for pointing in the direction of the platform nose is +90 degrees. The operator then finally specifies the range and azimuth resolution and the pixel spacing for the SAR images. The computer 200 then using standard spotlight SAR processing algorithms forms a series of SAR base image files 250, one for each requested squint angle, from the raw radar pulse data. For the data used in embodiments described herein (see FIG. 7), each radar pulse had 1536 complex digital samples corresponding to 1536 range gates and the radar 14 had recorded the pulses at a rate of 4000 pulses per second. The algorithms for forming spotlight SAR base images at squinted geometry from raw radar pulses are known. References 9 and 10 are just two examples from among several open literature references describing the method for producing spotlight SAR images at arbitrary squint angles from raw radar data from a moving platform.

For this example the system 100 is deployed to produce SAR base images from squint angle 15 degrees to 0 degrees. A total of 16 SAR base image files 250 are produced. These SAR base image files will be referred to hence forth as $M_1$, $M_2 \ldots, M_{16}$. $M_1$ is the label for the SAR base image file at squint angle 15 degrees, $M_2$ is the label for the SAR base image file at squint angle 14 degrees and so on. Using this labelling rule $M_{16}$ is the label for the SAR base image file at squint angle 0 degrees.

Each of the SAR base image files 250 is a 2-dimensional matrix that has 1000 rows with each row containing 284 columns. Each row represents radar data received from a specified range position and each column represents data from specified azimuth position. Therefore, for example element (100, 12) will be the radar data derived from the 100th range cell at the 12th azimuth cell. The full 2-dimensional matrix is thus a SAR image that is 1000 range cell pixels by 284 azimuth cell pixels in size. Each element or pixel in the 2-dimensional matrix is a complex number with a real and imaginary component. The pixel value represents the complex Radar Cross Section (RCS) for the corresponding location on the ground as measured by the radar. For this embodiment the range and azimuth pixel spacing is 0.3 m. Each pixel therefore corresponds to a 0.3 m by 0.3 m radar footprint on the ground. The entire SAR base image file 250 corresponds to a radar footprint that is 300 m long in range and 85.2 m wide in azimuth. The corresponding resolution of the image in range and azimuth is 0.5 m. This ratio between spatial sampling and true image resolution ensures optimum visualisation of the data. SAR base image files 250 are stored on the computer 200. The data files 250 are stored as binary files with an ASCII header that contains information on the pixel spacing and the SAR image squint angle. Thus for file $M_1$ the header will state a squint angle of 15 degrees. The generation of the SAR image data files $M_1$ to $M_{16}$ completes the SAR image formation process for system 100.

Figure 3:
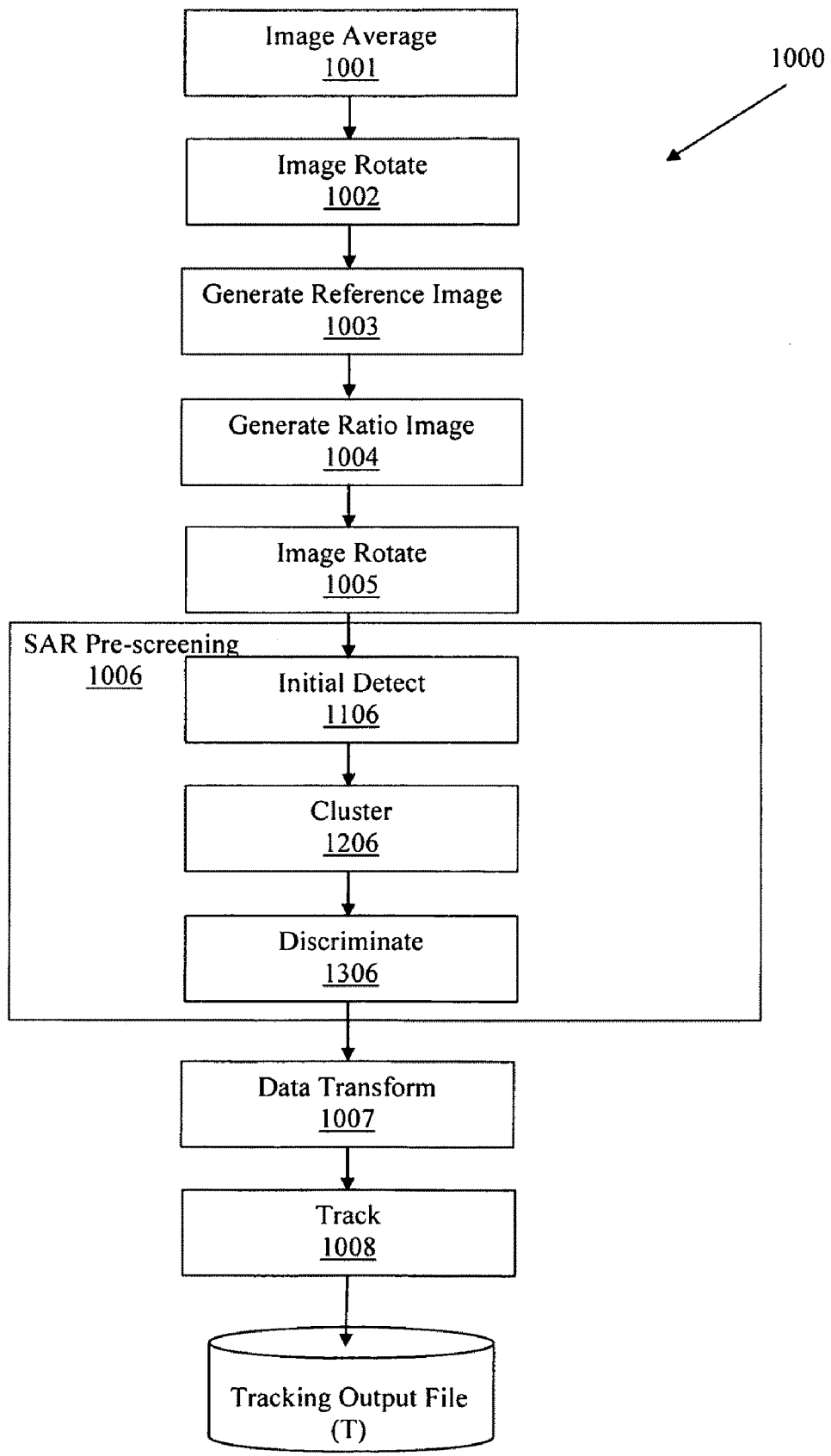
FIG. 3 is a flow diagram of the shadow detection system processing routines used in the system of FIG. 2.

FIG. 3 shows the steps involved in a first embodiment of the present invention. It shows a flow diagram illustrating the series of routine 1001 to 1008 executed by the computer 200 to process the SAR image files 250 to perform the shadow detection process 1000. The outcome from these routines is displayed on the display device 220 using the data link 300. The series comprise an image averaging routine 1001, an image rotation routine 1002, a reference image generation routine 1003, an image ratio generation routine 1004, another image rotation routine 1005, a SAR pre-screening routine 1006, a data transformation routine 1007 and a tracking routine 1008.

For each of image file $M_i$, where i=1, . . . , 16, the image averaging routine 1001 firstly converts the complex values into amplitude values by adding together the square of the real and imaginary component of each pixel value and taking the square root of the sum. The pixel values are then summed together using a 4 by 4 non-overlapping window and divided by the factor 16. This reduces the overall size of the 2-dimensional 1000 by 284 matrix by a factor 4 along each dimension to a matrix of size 250 by 71. The output of routine 1001 is a set of 16 averaged SAR base image files. These are labelled $A_1$ through to $A_{16}$. Reducing the size of the base image as described above speeds up the subsequent data processing. The averaging of the base image also simplifies the subsequent processing by partially smoothing any noise present in the images.

The next step is for the routine 1002 to rotate each of the averaged base image files $A_i$ by the squint angle where the squint angle is obtained from the file ASCII header. Following this rotation the image rows and columns are aligned along the platform across-track and along-track axis. Any given pixel in the transformed images now refers to the same location on the ground. All the images are now aligned with respect to the ground. For this embodiment $A_1$ is rotated by an angle 15 degrees, $A_2$ by an angle 14 degrees and so on. The output of the image rotation routine 1002 is a set of 16 rotated averaged SAR base image files. These are labelled $B_1$ through to $B_{16}$.

The reference image generation routine 1003 produces a reference image corresponding to each base image from routine 1002. For a given image $B_i$ the reference image is formed by adding together the four proceeding images i.e.

$$B_i^{ref}=B_{i-1}+B_{i-2}+B_{i-3}+B_{i-4} \text{ where } =5 \text{ to } 16 \quad (1)$$

Note that $B_1$, $B_2$, $B_3$, and $B_4$ do not have a corresponding reference image since they have fewer than four proceeding images. For the current embodiment the routine 1003 produces a total of 12 reference images, labelled as $B_5^{ref}$ to $B_{16}^{ref}$.

Of course, the reference image may be produced in any other suitable manner. For example, the reference image could comprise an image, each pixel of which represents the maximum pixel value of the corresponding pixel in a plurality of base images.

The next step is the normalisation to produce the change detection image. This embodiment produces the change detection image by creating a ratio, and so therefore uses the term "ratio image" to describe the change detection image.

The ratio image is generated by the image ratio generation routine 1004 that forms a ratio between the reference and the corresponding image given as $$R_i=B_i^{ref}/B_i \text{ where } i=5 \text{ to } 16 \quad (2)$$

Here $R_i$ is the label referring to the ratio image for the i-th sequence image. The ratio image routine 1004 is applied on a total of 12 images starting from sequence number 5 and finishing with image sequence number 16.

Figure 4:
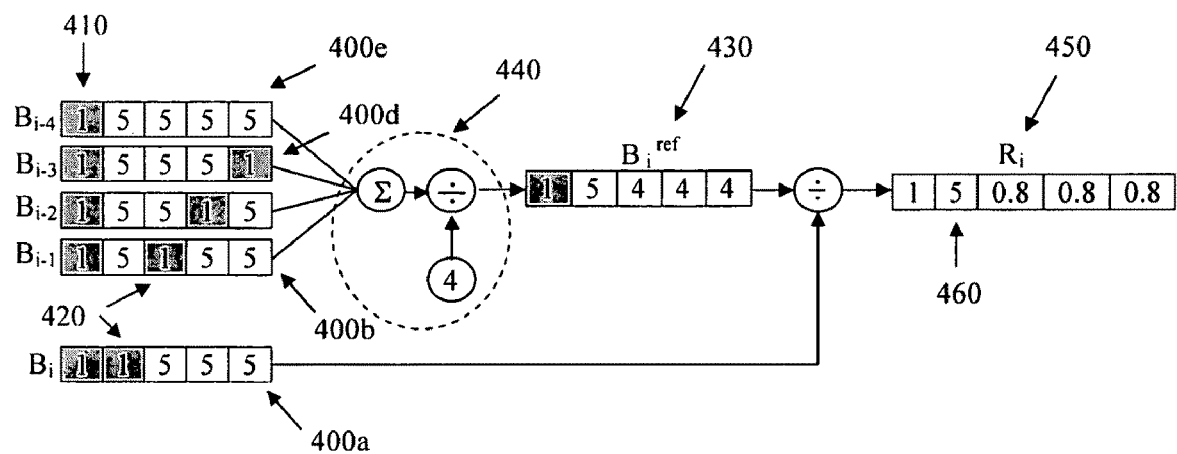
FIG. 4 illustrates schematically the formation of the ratio image by the system of FIG. 3.

The generation of the ratio image (or more generally the change detection image) using the reference image is the key to this invention and is the mechanism by which the change detection for the moving shadows is realised. The mechanism by which this process manipulates the images is further explained with the aid of FIG. 4. For the sake of this explanation, each base image is assumed to comprise of a single row of data that has five columns. As a further simplification clutter pixels are assigned a value five and shadow pixels a value one. On the left hand side in FIG. 4 are shown the image $B_i$ 400a and immediately above it the four preceding images $B_{i-1}$ to $B_{i-4}$ 400b-e. All of these images have a shadow pixel 410 in the left most column which is from a static target. There is also a shadow pixel 420 due to a moving target. It first appears in the image labelled as $B_{i-3}$ 400d in the right most column. Over the next few images it shifts toward the right ending up in the column adjacent to the static shadow pixel in image $B_i$ 400a. The four preceding images B–1 o $B_{1-4}$ 400b-e combine together in summation and averaging step 440 to form the reference image $B_i^{ref}$ 430 which is shown as the centre image in FIG. 4. It can be seen that the reference image 430 is preserving the static elements among the images and suppresses those aspects that are changing. Thus the static shadow of column one 410 appears in the reference image but the moving shadow does not. The pixel values in the second to fifth column of $B_i^{ref}$ 430 are the averaged clutter value. The image 450 on the right in FIG. 4 is then the ratio image $R_i$ formed in the normalisation step by dividing $B_i^{ref}$ with $B_i$. It can be seen that in the ratio image apart from the second pixel all the others pixel values are one or less. A low value (one that is less than or equal to one) occurs when the scene is not changing. This would occur either when there is static clutter (pixel number three to five of $R_i$) or when there is static shadow present (pixel number one in $R_i$). A high value pixel 460 (one that exceeds unity) indicates the presence of a moving shadow. Thus the high value of the second pixel 460 in $R_i$ corresponds to the presence of a moving shadow in $B_i$ 420 at the same pixel position. So the ratio image has this very useful property that only pixels with moving shadows will have high value. Thus detecting these high value pixels in the ratio image provides a mechanism for detecting moving shadows and thus moving targets using SAR imagery.

Following normalisation in the ratio image routine 1004, the subsequent routines 1005 to 1006 in the system 1000 of FIG. 3 describe the method for automatic detection of the moving shadows using the ratio images.

For this embodiment, the next step following the creation of the ratio images $R_i$ is to rotate them back into the original image co-ordinate axis. This is performed using the image rotation routine 1005. As in routine 1002, the squint angle in the file header determines the amount by which the image is rotated. The difference with routine 1005 is that the rotation is performed in the opposite direction. Thus for example if the squint angle is 10 degrees then the rotation angle will be –10 degrees. The routine processes a total of 12 ratio images and the output files are labelled $C_i$ where i=5 to 16.

The pre-screening routine 1006 then processes each of the $C_i$ files and generates a list of plot detections. The pre-screening consists of three sub-routines, initial detection (1106) (e.g. CFAR processing), clustering (1206) and discrimination (1306).

Figure 5:
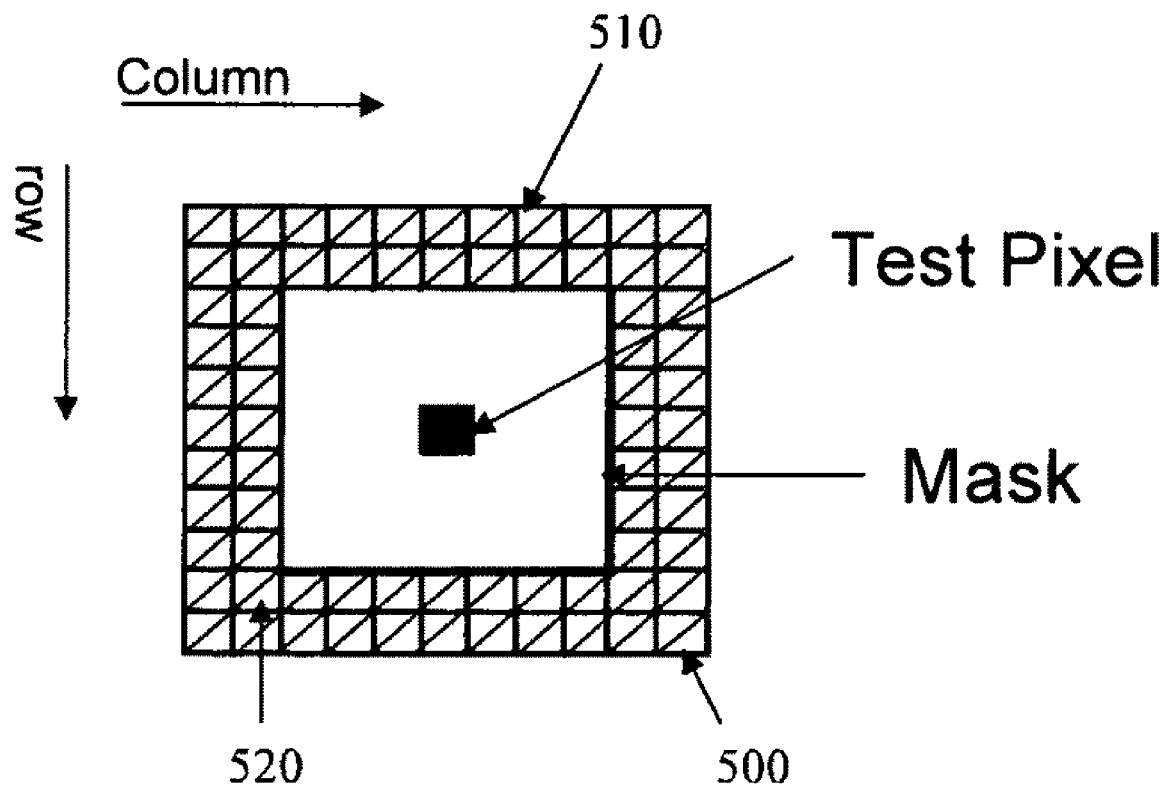
FIG. 5 illustrates schematically how data points in the SAR image formed by the system of FIG. 2 are selected for use in the Constant False Alarm Rate (CFAR) algorithm deployed in the system of FIG. 3.

The initial detection routine 1106 performs a bright anomaly detection. This applies a CFAR adaptive thresholding to the image $C_i$ to flag up pixels that are anomalously bright compared to the local background. The CFAR detection technique is familiar to those skilled in the art of radar engineering. There are two parts to the calculations of the CFAR threshold. The first involves analysing each pixel of $C_i$ to estimate local background statistics using a CFAR window of data pixels immediately surrounding the test pixel. Thus referring to FIG. 5 for a given test pixel within an image $C_i$ two rectangular region are identified. An outer rectangle 500 marks the overall extent of the CFAR window and an inner rectangle 510 is a mask window. The CFAR algorithm will use all the pixels within the bounds of the CFAR window excluding the test pixel and the pixels that lie within the mask window, in estimating the background statistics. The background statistics are therefore based on an outer ring of data points 520 shown hatched in FIG. 5. The background statistics may range from a simple arithmetic mean of the pixel values to more complex expressions depending upon an assumed statistical model for the background.

The second part of the threshold calculation process involves scaling the estimated background statistics by a constant factor. The scaling factor is derived from the Probability of False Alarm ($P_{FA}$) value specified for the CFAR detection process. The PFA is fixed for the entire process 1000.

For this embodiment a CFAR window size of 14 rows by 8 columns is chosen. The mask width is set to 4 rows by 12 columns. The $P_{FA}$ is set to 0.01. The background statistics are assumed to be single look K-distribution. A CFAR algorithm of this form is termed KCFAR, and more details of it can be found in Reference 1. For each image $C_i$ the initial detection routine 1106 outputs a corresponding binary image of the same size. The binary images, labelled $D_i$, where i=5 to 16, comprises of pixels of values zeros and ones where a one denotes a detection and a zero denotes no detection.

Clustering routine 1206 searches through the binary image $D_i$ and groups neighbouring pixels with values one into unique clusters. The clustering routine 1206 is known, and more details of generic clustering algorithms of the type used by routine 1206 can be found in Reference 11. For each cluster that is identified in the binary image $D_i$, the clustering routine outputs a list that contains a unique id number for the cluster, the number of pixels in the cluster and the row and column indices of the pixels identified as belonging to that cluster. Thus for example routine 1206 could output a list of the form 1 3 100,25; 100,26; 100,27

This output list states that routine 1206 has found just one cluster which has been assigned the unique id number "1". The total number of pixels in this cluster is three. The next three pair of numbers are the row and column indices of the three pixels belonging to cluster "1". The routine 1206 produces a cluster list file of this format corresponding to each binary image file $D_i$. These cluster list files are ASCII text files and are labelled $L_i$. There is one line of data per unique cluster. A total of 12 $L_i$ files are produced where i=5 to 16.

For this embodiment the parameters for the clustering routine 1206 are set to allow a maximum separation of 6 pixels in rows and 2 pixels in columns for any given cluster. The maximum cluster length is set to 100 pixels along the row axis and 50 pixels along the column axis. These values were selected based on expected size of potential shadows.

Once the pixels are clustered, a discrimination routine 1306 is used to reject false alarms. It rejects clusters that are too small or too large or those that are not of the correct shape for target shadows. It uses a set of simple shape based features to perform this filtering process. A total of six discrimination features are used. These are the (1) number of pixels in the cluster, (2) the cluster length, (3) the cluster width, (4) the cluster area (length multiplied by width), (5) the cluster aspect ratio (length divided by width) and (6) orientation of the cluster. The discrimination routine 1306 uses the binary image $D_i$ along with the corresponding cluster list file $L_i$ to calculate the six discriminating features associated with each cluster. For a cluster to be accepted as a valid shadow target the following criteria has to be met by the discriminating features:

Minimum number of pixels=6
Minimum cluster length (m)=6
Maximum cluster length (m)=40
Minimum cluster width (m)=1
Maximum cluster width (m)=15
Minimum cluster area (m$^2$)=1
Maximum cluster area (m$^2$)=400
Minimum cluster aspect ratio=1
Maximum cluster aspect ratio=15
Orientation angle exclusion range (degrees)=20 to 70

The last criterion entails that any cluster whose orientation angle falls within the specified interval is rejected.

For each binary image $D_i$, the routine 1306 reads the corresponding cluster list file $L_i$. For each cluster listed in $L_i$, (one per line), routine 1306 extracts a rectangular window from the image $D_i$. The size and location of the extraction window in image $D_i$ is set such that it includes all the pixels identified as belonging to a specific cluster. However, since the cluster pixels are going to be spread somewhat randomly, a rectangle shape sub-image is likely to contain a number of zero-value pixels.

Figure 6:
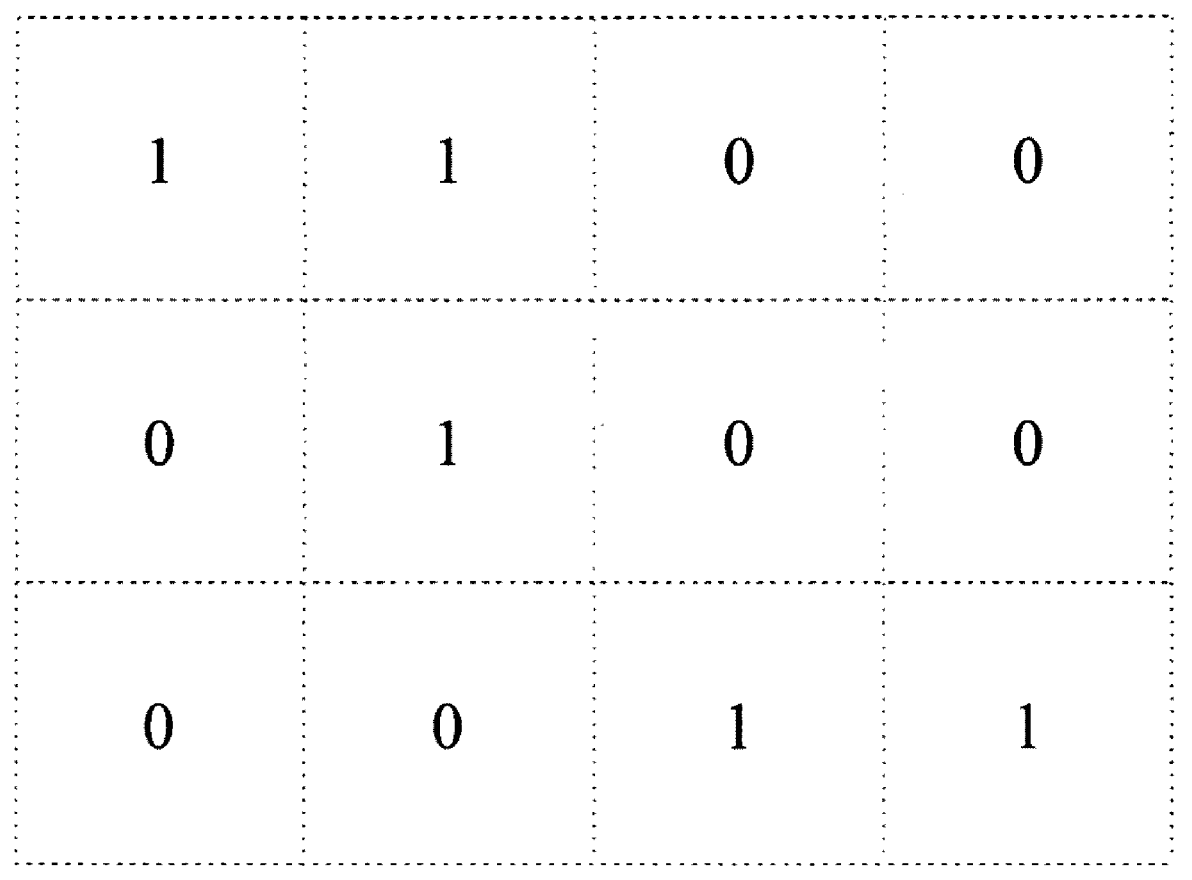

This is explained further with the aid of FIG. 6 which illustrates a 4 by 3 sub-image for a hypothetical five pixel cluster. As can be seen from FIG. 6 there are seven zero-value pixels in this sub-image. The binary sub-images corresponding to each cluster are used to estimate the cluster length, width and orientation using spatial moments. The spatial moment based estimation method is familiar to those skilled in the art of radar engineering and Reference 12 provides a suitable reference on this subject. From the length and width estimates, the cluster area and aspect ratio values can then be calculated.

The discrimination process of routine 1306 involves reading the cluster list $L_i$. For each cluster listed in $L_i$, a rectangle sub-image from the corresponding binary image file $D_i$ is extracted and the six spatial feature are estimated. The feature values are compared with the acceptance criteria listed earlier. Clusters for which any one of the feature value falls outside the acceptance range are reject as false alarms. Details for accepted clusters are saved into a pre-screening detection file. This pre-screening detection file is an ASCII text file and is labelled P. The information that is recorded for each accepted cluster is the image index number "i", the squint angle corresponding to image i, the cluster centre pixel position as a row and column index number along with the cluster length, width and orientation. Thus the file entry for each accepted cluster will be as follows i squint angle cluster_centre_row_no cluster_centre_column no length width orientation The discrimination routine 1306 processes each pair of $L_i$ and $D_i$ data files and store the output in file P using the format shown above. The process is repeated for all 12 pairs of data files and the results from each stored in the file P.

The data file P contains the results for the shadow pre-screening as a result of processing all the available images. It contains the complete lists of all the shadows detected over the full set of images. The location for each detection refers to the centre point of the shadow. The next step is for the data transformation routine 1007 to transform the data of file P into a format appropriate for the tracker routine 1008.

Each line in the file P refers to a separate detection. Entries with identical image index number relate to detections reported for the same image. The routine 1007 reads each line and performs two operations. The first operation is to calculate the location of the target using the estimated shadow centre position provided by routine 1006. The pre-screening routine 1006 provided estimates for the centre position of the shadow region. Secondly, the co-ordinate axis is transformed to align with the platform along-track and across track axis.

The original co-ordinate axis is for slant-range to be along the row axis with the column axis representing the direction perpendicular to slant-range. Of course, as the target must lie at an edge of the shadow, in this frame-of-reference the target location is up-range from the shadow centre position. For a given shadow row and column centre position of $r_s$ and $c_s$ respectively the corresponding target row $r_t$ and column $c_t$ positions are estimated approximately as follows $$r_t = r_s - \{length*sin(orientation) + width*cos(orientation)\}/2/0.3$$

$$c_t = c_s$$

Here length, width and orientation are the shadow features values in meters and degrees. "sin" and "cos" are the trigonometric functions sine and cosine of an angle and the scaling by the factor 0.3 is due to the row spacing in this embodiment being 0.3 m.

The routine 1007 then multiplies the target position values ($r_t$, $c_t$) by the averaging factor used in routine 1001. In this embodiment it takes the form of multiplying both $r_t$ and $c_t$ by the factor four. This scales the target position index values back into the original image size which for this embodiment is a 1000 by 284 matrix.

Once the target position index has been re-scaled, routine 1007 then rotates the co-ordinates by the squint angle. This aligns the row and column index with the platform cross-track and along track axis. This ensures that detections across all the images are indexed using a common frame-of-reference. This rotation is done because the pre-screening steps of Initial Detection 1106, Clustering 1206 and Discrimination 1306 as described above were, in this particular embodiment, designed to work on images in their original orientation, whereas the following stage, the particular implementation of tracking routine 1008, requires in this embodiment the outputs from the pre-screening step 1006 to be suitably aligned.

The target row and column positions along with the image index number are recorded to a modified pre-screening file labelled as Q. The file Q is also an ASCII text file that contains one line entry per detection. Each entry is of the form
i target_row_no target_column_no where the first entry refers to the image index number and the next two entries the position of the target.

Routine 1007 process each target entry in file P and outputs the results to file Q. The file Q has the same number of entries as file P. The data in file Q is in the format that can be passed to the tracker routine 1008.

The tracker routine 1008 applies a standard x-y Kalman filter to the data from file Q. This technique is familiar to those skilled in the art of tracking algorithms. A good reference on Kalman filter trackers is provided by Reference 13.

The output from routine 1008 is stored in a tracker output file that is labelled T. This is also an ASCII text file. It contains a list of targets that have produced valid tracks. Each entry recorded as a separate line in file T specifies the image index number, a unique track identifier and the target estimated row position, row velocity (m/s), column position and column velocity (m/s). The tracker can report a number of tracks for a given image. These will have the same image index number but different track id numbers. A valid track is declared only if the target is detected in three or more consecutive images. The entries belonging to a specific track will have the same track id number but incrementing image index numbers. For example an entry in the file T may have the following values
6 3 145 5.6 55 1.2

This entry means that in image 6, the target belonging to the unique track id 3 is reported at row position 145 with a velocity along the row direction of 5.6 m/s. Its column position is 55 with a velocity along the column axis of 1.2 m/s. The generation of the tracking result file T completes the shadow detection system 1000.

Of course, it will be clear to the normally skilled person that the pre-screening and subsequent tracking of the ratio images may be performed using any suitable algorithm, and the invention is not limited to those methods described herein.

Figure 7:
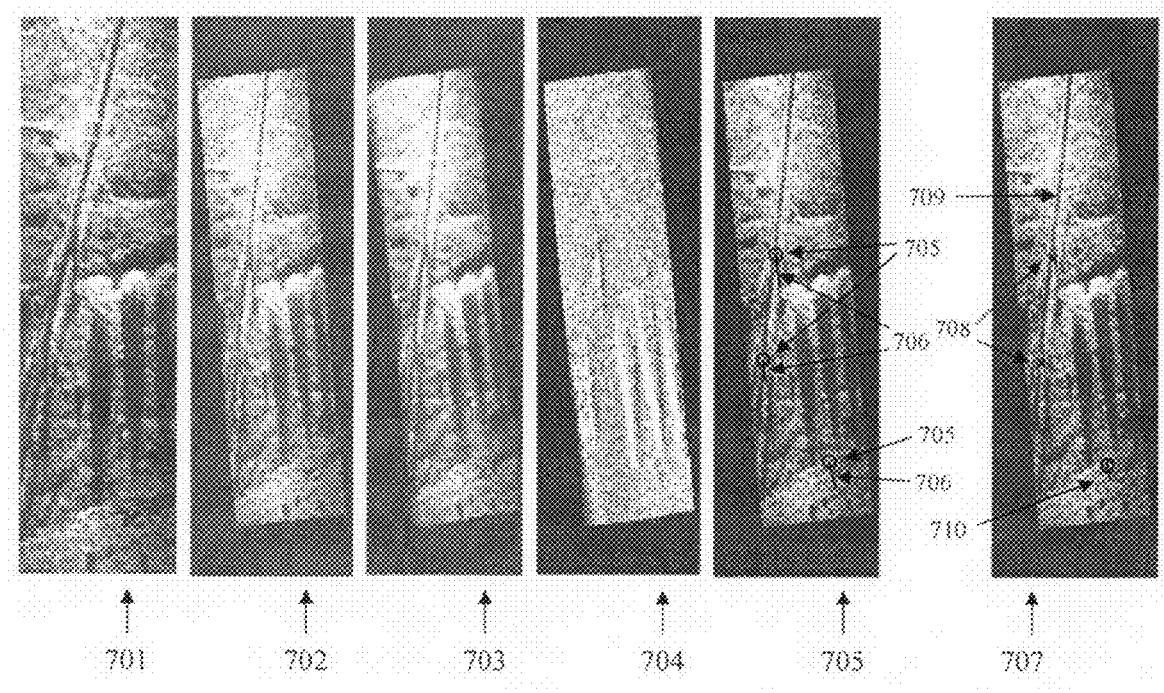
FIG. 7 shows, using real SAR imagery, example results of one embodiment of the system described in relation to FIG. 2.

To further illustrate the performance of the invention as described herein, reference is now made to FIG. 7. This shows the results of the shadow detection system 1000 for one of the SAR base images processed according to the specific embodiment of this invention as described above. The example image selected is image $M_{10}$. This is the tenth image out of the sixteen original SAR base images. The corresponding squint angle is 6 degrees.

The image $M_{10}$ is processed by the image average routine 1001 and produces the averaged base image $A_{10}$ 700. The image orientation is such that slant range is along the rows (vertical axis) and azimuth is along the columns (horizontal axis). Routine 1002 rotates the image by the squint angle and image 701 is the rotated, averaged SAR base image $B_{10}$. The image axes are now aligned with the platform across-track (rows) and along-track (column) axis. Routine 1003 produces the reference image $B_{10}^{ref}$ 702 by filtering using the temporal averaging filter based on the average of base images $B_9$ to $B_6$. The output of the normalisation stage, Generate Ratio image, routine 1004, is the image $R_{10}$ 703. The image $R_{10}$ 703 is then rotated back by the squint angle using routine 1005. Routine 1006 performs shadow pre-screening as described above and saves the results in output file P. The shadow positions are used to estimate the likely target positions associated with each shadow and these are stored in file Q. Image 704 in FIG. 7 shows the image $B_{10}$ with the detection results from file Q overlaid. Only the detections corresponding to image $B_{10}$ are shown. The target positions 705 are marked with circles. The shadow regions 706 as detected by the pre-screening routine 1006 are also shown. These are shown as lines 706. Image 707 shows the results from the tracker output given in file T Once again the results are only shown for image $B_{10}$. It can be seen that the tracker has reported two targets each marked with a cross 708 that are reported to be moving along the cinder track 709 seen in the SAR image 707. There has also been one false alarm 710 from the pre-screening stage that the track has rejected.

The skilled person will be aware that other embodiments within the scope of the invention may be envisaged, and thus the invention should not be limited to the embodiments as herein described. For example, if used in relation to a sonar system, the synthetic aperture sonar system itself would be different in ways, such as type of sensor, frequencies of operation etc, obvious to the normally skilled person. Images produced by a sonar system may be processed according to the present invention however.

REFERENCES

[1] G Blucher, D Blacknell, N J Redding and D Vagg, "Prescreening algorithm assessment within the analysts' detection support system", *Proc. International Radar Conf* 2003, Adelaide, Australia, September 2003, pp454-459

[2] D Barker and C Baker, "Single beam SAR MTI", *IEE Proc. SAR' 93*, 26 April 1993, France. pp. 14-17

[3] J R Fienup, "Detecting Moving Targets in SAR Imagery by Focusing", *IEEE Trans. AES.*, vol. 37, No. 3, 2001, pp. 794-809

[4] A Freeman and A Currie, "Synthetic Aperture Radar (SAR) Images of Moving Targets", GEC *J. Res.*, vol. 5, No. 2, 1987, pp. 106-115

[5] P Lombardo, M Sciotti and L M Kaplan, "SAR prescreening using both target and shadow information", *Proc. IEEE Radar Conference* 2001, Atlanta, USA, pp 147-152, 2001

[6] A Bennet and D Blacknell, "The extraction of building dimensions from high resolution SAR imagery", *Proc. IEEE Inter. Conference on Radar*, Adelaide, Australia, 2003

[7] A Blacknell & D N Pedlar, "SAR Target Detection and Aided Target Recognition", QINETIQ/S&E/APC/CR032015, Sept 2003

[8] http://www.thales-communications.ltd.uk/pdf/sigmgt/AirborneRCS_ADAS.pdf

[9] W G Carrara, R S Goodman and R M Majewski, "Spotlight Synthetic Aperture Signal Processing Algorithms" Boston, Artech House, 1995

[10] C Y Chang, M Jin, and J C Curlander, "Squint Mode SAR Processing Algorithms", *Proc. IEEE International Geoscience and Remote Sensing Symposium IGARSS* 1989, pp: 1702-1706, July 1989

[11] M R Anderberg, "Cluster Analysis for Applications", Academic Press, 1973.

[12] M R Teague, "Image analysis via the general theory of moments", *J. of Optical Society of America*, vol. 70, No. 8, 1979, pp. 920-930

[13] E Brooker, "Tracking and Kalman Filtering Made Easy", Wiley Interscience, 1998.

The invention claimed is:

1. A method of processing a temporal sequence of returns from a Synthetic Aperture system, the returns comprising a plurality of base images of a region characterised in that it comprises the steps of:
   i) temporally filtering two or more of the plurality of base images to form a reference image, the two or more base images being suitably spatially aligned with respect to each other;
   ii) forming a "change detection image" image by normalising the reference image with a given base image from the sequence, the given base image being suitably aligned with the reference image.

2. A method as claimed in claim 1 wherein the method includes the additional step of performing a threshold detection on the change detection image to locate image elements above a threshold to produce an output image associated with the given base image.

3. A method as claimed in claim 2 wherein the threshold detection is performed with a Constant False Alarm Rate (CFAR) threshold detector.

4. A method as claimed in claim 1 wherein the temporal filtering of step i) comprises averaging the two or more base images to produce the reference image.

5. A method as claimed in claim 1 wherein the normalisation is performed by dividing the reference image by the given base image, to produce the corresponding change detection image.

6. A method as claimed in claim 2 comprising an additional step of analysing the output image to assess spatial clustering within the output image.

7. A method as claimed in claim 6 wherein the assessment of spatial clustering comprises rejecting any clusters from the output image that are outside a defined cluster characteristic.

8. A method as claimed in claim 1 wherein the steps are iterated for a plurality of the base images to produce a plurality of output images.

9. A method as claimed in claim 8 wherein a sequence of output images are analysed to identify a target track in successive output images.

10. A method as claimed in claim 8 wherein a different reference image is produced for each base image processed.

11. A method as claimed in claim 1 wherein the returns are from a synthetic aperture radar system.

12. A method as claimed in claim 1 wherein the returns are from a synthetic aperture sonar system.

13. A processing system for processing returns from a Synthetic Aperture system, comprising a processor adapted to receive data from the synthetic aperture system, the data comprising information from a region taken over a plurality of instances, the processing system comprising a processor adapted to process the data in the form of images, the images comprising a plurality of base images;
   characterised in that:
   the processor is adapted to apply a temporal filter to two or more of the plurality of base images to form a reference image, the two or more base images being suitably spatially aligned with respect to each other; and
   the processor is further adapted to normalise the reference image with a given base image to form an associated change detection image, the given base image being suitably aligned with the reference image.

14. A system as claimed in claim 13 wherein the processor is adapted to produce an output image by performing a threshold detection process thereon to locate image elements above a given threshold.

15. A system as claimed in claim 13 wherein the temporal filter comprises an averaging filter.

16. A system as claimed in claim 13 wherein the normalisation takes the form of dividing the reference image by the given base image.

17. A system as claimed in claim 14 wherein the processor is adapted to process the output image to assess spatial clustering therein.

18. A system as claimed in claim 14 wherein the processor is adapted to produce a plurality of output images corresponding to a plurality of base images.

19. A system as claimed in claim 18 wherein the processor is adapted to identify a target track in successive output images.

20. A system as claimed in claim 13 wherein the synthetic aperture system is a synthetic aperture radar.

21. A system as claimed in claim 13 wherein the synthetic aperture system is a synthetic aperture sonar.

22. A computer program comprising a set of instructions arranged to run on a computer system, the system comprising at least a processor and memory, the instructions of the computer program being arranged to carry out the method of claim 1.

23. A computer program stored on a non-transitory computer-readable medium, to cause a computer to execute the method of claim 1.

* * * * *